No. 778,732. PATENTED DEC. 27, 1904.
E. J. AFEMAN.
COTTON SEED BIN.
APPLICATION FILED MAR. 7, 1904.
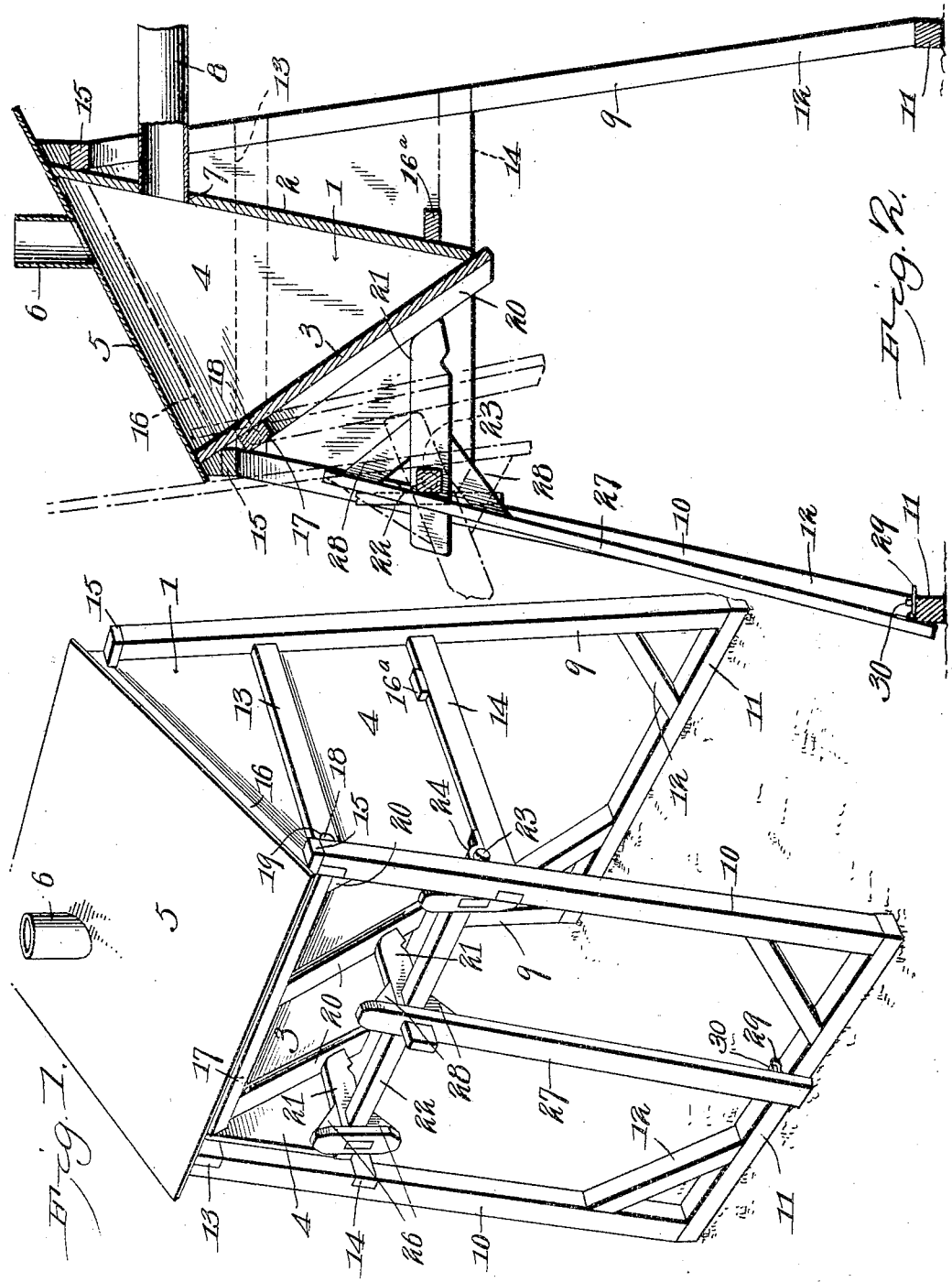
Witnesses:
E. J. Stewart
R. M. Elliott
Ernest J. Afeman, Inventor,
by C. A. Snow & Co.
Attorneys No. 778,732. Patented December 27, 1904.

UNITED STATES PATENT OFFICE.

ERNEST J. AFEMAN, OF MORROW, LOUISIANA.

COTTON-SEED BIN.

SPECIFICATION forming part of Letters Patent No. 778,732, dated December 27, 1904.

Application filed March 7, 1904. Serial No. 197,036.

*To all whom it may concern:*

Be it known that I, ERNEST J. AFEMAN, a citizen of the United States, residing at Morrow, in the parish of St. Landry and State of Louisiana, have invented a new and useful Cotton-Seed Bin, of which the following is a specification.

This invention relates generally to bins, and particularly to a bin for holding cotton planting-seeds.

The object of the invention is in a ready and convenient manner to store cotton planting-seeds in such manner as while being effectively shielded from the elements they may without labor be discharged into a wagon in any quantity desired; furthermore, to obviate any waste of the seed by accidental discharge from the bin.

With the above and other objects in view, as will appear as the nature of the invention is better understood, the same consists in the novel construction and combination of parts of a bin for holding cotton planting-seed, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in perspective taken from the front side of the apparatus. Fig. 2 is a vertical longitudinal section showing the closed position of the bin-door in full lines and its open position in dotted lines.

The structure of this invention embodies a bin 1, which, as shown in Fig. 2, is a hopper-shaped structure the rear wall 2 of which is fixed and the front wall 3 hinged or pivoted for swinging movement. The end walls 4 are approximately rectangular in shape, so that when the front wall or door 3 is opened there will be no escape of seed past them. The upper end of the bin is closed by a roof or top 5, preferably of metal, to render the structure waterproof, the roof being provided with a vent-pipe 6 to permit escape of air. The rear wall 2 of the bin is provided with an opening 7, with which connects a pipe 8, leading to the bin, the seeds being supplied to the bin in any preferred manner.

The bin is supported upon a framework comprising two rear and two front uprights 9 and 10, respectively, the lower ends of which are connected and braced by sills 11 and rendered rigid by corner-braces 12. The upper portions of the uprights are connected and braced by cross-pieces 13 and 14, which operate to support the bin, and are further braced at their upper ends by cross-braces 15, to which are secured the roof-timbers 16, as clearly shown in Fig. 2. The rear wall is held against backward yielding at its upper end by the rear cross-brace 15 and at its lower end by a cross-brace 16$^a$, carried by the cross-pieces 14.

Secured to the outer portion of the door 3 is a bar 17, having its terminals projected beyond the door and reduced to form pintles 18, which work in openings or bearings 19 in the cross-pieces 13, and extending vertically of the door from the bar to its lower end are battens 20, of which there are shown in this instance three in number. The battens not only subserve the function of reinforcing the door, but also serve as bearing-surfaces for a plurality of latches 21, corresponding in number to the battens, said latches operating to hold the door in its locked position and also to raise it when desired. The latches, which may be made of wood, are carried by a bar 22, having its end formed with pintles 23, which work in bearings 24 supported by the cross-pieces 14. The connection between the latches and the bar 22 may be accomplished in any preferred manner and in this instance by providing the latches with openings through which the bar projects, the outer ends of the two end latches having head-plates secured to them, from which extend braces 26. The center latch is similarly secured to the bar, but projects some distance outward beyond the same to form a means of attachment for a releasing-lever 27, the said lever being mortised to fit over the projecting end of the latch and being additionally secured thereto by braces 28. The inner ends of the latches are beveled or wedge-shaped in order to exert a cam action upon the battens, thus with the minimum of labor to enable an attendant to close the door against the weight of the seed contained in the bin. Ordinarily the weight of the releasing-lever may be relied upon to keep the door closed; but as a matter of precaution a fastening device of any preferred character may be employed, in this instance shown as a hasp 29 adapted to engage a bolt 30 on the front sill 11.

In the operation of the device a wagon is driven under the bin and the operator lifts the releasing-lever and the weight of the seed will cause the door to press against the latches, thereby enabling the operator to graduate the feed as desired. When the wagon has received its load, the operator then depresses the lever and secures in position through the medium of the hasp and bolt.

The structure as a whole is exceedingly simple in construction and may be built by an ordinary house-carpenter and in use will be found thoroughly effective for the purpose designed and practically free from liability of becoming deranged from long-continued use.

Having thus fully described my invention, what I claim is—

1. An apparatus of the class described comprising a bin, having fixed sides and back and a front pivoted at its upper end, means coacting with the back for supplying material to the bin near its top, a roof, a plurality of latches normally in engagement with the front, and a lever for actuating the latches to close the front.

2. An apparatus of the class described comprising a framework, a bin supported in the upper portion thereof and having its upper side closed and provided with a vent and its back fixed, a front pivoted at its upper end and coacting with the back to prevent the escape of material from the bin, latches operating normally to hold the front closed, and a lever for actuating the latches to open or close the front.

In testimony that I claim the foregoing as my own I have hereto affixed my signature in the presence of two witnesses.

ERNEST J. AFEMAN.

Witnesses:
   JOSEPH J. SCOTT,
   LEOPOLD GOUDCHAUX.